United States Patent [19]

Bosna

[11] Patent Number: 4,539,465
[45] Date of Patent: Sep. 3, 1985

[54] WIRE FEED SYSTEM FOR ROBOT WELDER

[75] Inventor: Alexander A. Bosna, Arnold, Md.

[73] Assignee: Westinghouse Electric Corp., Pittsburgh, Pa.

[21] Appl. No.: 567,455

[22] Filed: Dec. 30, 1983

[51] Int. Cl.³ .............................................. B23K 9/12
[52] U.S. Cl. ................................ 219/137.7; 219/136; 901/42; 901/48
[58] Field of Search ................... 219/125.1, 136, 137.2, 219/137.31, 137.51, 137.7; 901/42, 41, 48

[56] References Cited

U.S. PATENT DOCUMENTS 3,543,989 12/1970 Cooper .............................. 901/42 X

FOREIGN PATENT DOCUMENTS 2253291 5/1973 Fed. Rep. of Germany ...... 219/136
200370 9/1981 German Democratic Rep. ... 901/48
1393349 5/1975 United Kingdom ................... 901/48

OTHER PUBLICATIONS

"Swedish Robot Welds Boilers and Mast Modules", *Welding and Metal Fabrication* (Oct. 1980), pp. 535-536.

Primary Examiner—Roy N. Envall, Jr.
Assistant Examiner—C. M. Sigda
Attorney, Agent, or Firm—Walter G. Sutcliff

[57] ABSTRACT

A wire storage and feed system for a robotic welding system in which the wire storage and feed system is mounted on the movable robot arm which has the welding gun disposed at the extending end of the robot arm. The wire storage and feed system includes a wire storage reel and wire feed drive which are movably mounted on the robot arm. A constant force spring is attached to the movable portion of the wire storage and feed system to maintain a constant tension on the welding gun, with counterweight connected to the movable portion, with the counterweight moving opposite to the movable portion of the wire storage and feed system to permit accurate positioning of the welding gun irrespective of robot arm movement and position.

6 Claims, 3 Drawing Figures

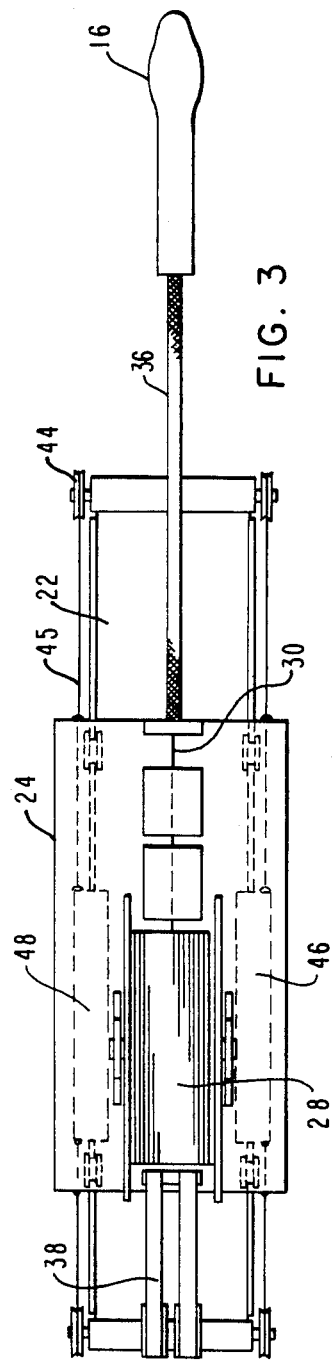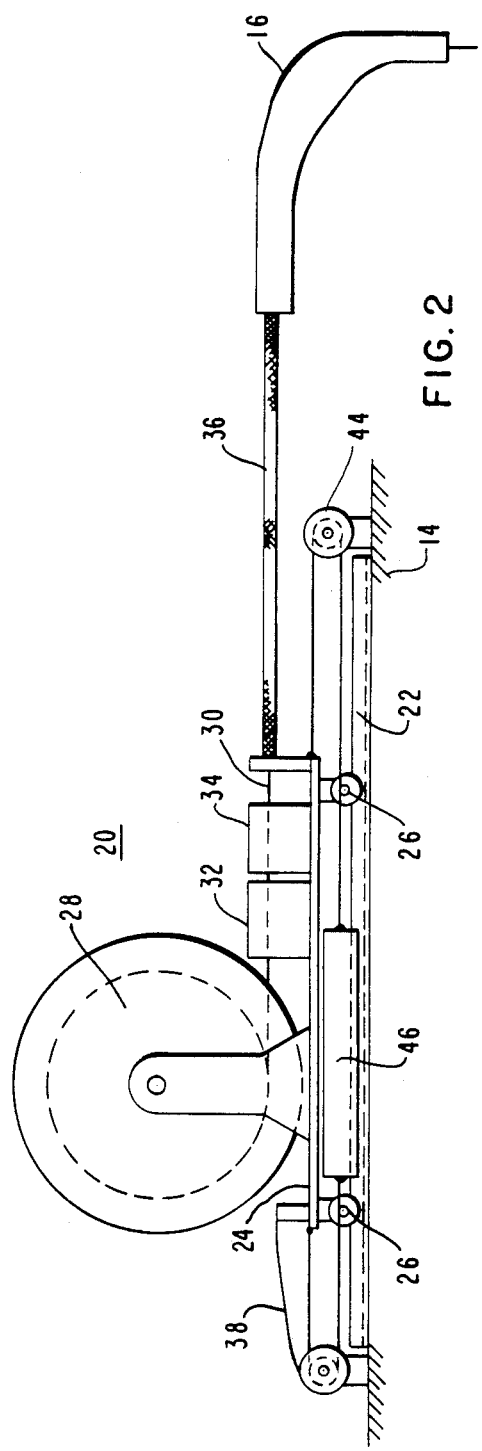

WIRE FEED SYSTEM FOR ROBOT WELDER

BACKGROUND OF THE INVENTION

The present invention relates to metal inert gas robot welders, and more particularly to the wire feed system for such welders. These welders are widely used in assembling electronic packages or modules, which are typically fabricated of aluminum. The aluminum wire electrode which is used for such applications is a small diameter, difficult to handle wire, which must be fed from a wire storage reel to the welding gun, which may be spaced some distance away from the workpiece.

Further background regarding metal inert gas welding, also referred to as gas metal arc welding, and the prior art structures and process parameters can be had from "Welding Handbook" 7th Ed., Vol. 2, pgs. 114-139. In general in a metal inert gas welder, the metal filler electrode is fed as a wire through a welding gun with an inert shielding gas being directed through the wire feed nozzle of the gun about the welding area. The metal filler electrode wire is fed from a supply or storage reel through an electrode guide tube or conduit to the welding gun, with electrical contact to the welding power supply being made to this wire by a current contact tube within the welding gun. A push-pull wire feed or drive mechanism can be located as part of the gun or at the wire supply reel.

Such welders can be automated by mounting the welding gun on a maneuverable robot arm, with the robot controlling the welding operation, and moving the gun over the workpiece in a prescribed path to complete fabrication, of for example, an aluminum chassis, ductwork, heat exchanger housings, or electronic package, all of which are used in radar systems. The robot arm is maneuverable in plural axes, and its positioning of the welding gun at the workpiece must be very accurate, with a computerized control sequence used to align the gun with the workpiece. The workpiece is mounted on a work table which is movable and controlled also by the robot control system. The mounting of the electrode wire storage and feed system upon the robot arm reduces problems associated with feeding small diameter wires over long distances from remotely located storage reels. However, the weight of such wire storage and feed systems, as well as the variation in the weight of the wire stored with time makes it difficult to accurately control positioning of the welding gun by the robot arm.

It is desirable that a constant tension be maintained on the welding gun disposed at the extending end of a robot arm irrespective of movement or position of the robot arm. This will ensure precise controllable alignment of the welding gun with the workpiece.

SUMMARY OF THE INVENTION

A wire feed system for a metal inert gas welding system in which the welding gun is disposed at the extending end of a robot arm, with the wire feed system mounted on the robot arm. The wire feed system comprises a base member mounted rigidly on and extending along the robot arm with pulley means disposed at opposed ends of the base member. A reciprocally movable mounting member is mounted from the base member and connector means extend from opposed ends of the mounting plate, which connector means are disposed over the respective opposed pulley means and are connected to counterweight means which are slidably disposed upon the base plate. A wire storage spool or reel is mounted on the movable mounting member, and is aligned with wire straightening means and wire feed drive means both of which are mounted on the movable mounting plate. A wire conduit means extends between the wire feed drive means and the welding gun. Small diameter welding wire is fed from the storage spool through the straightener and drive means through the wire conduit means to the welding gun. A constant force spring means is connected between the opposed end of the mounting plate from which wire is fed and the base plate, whereby a constant tension is maintained on the welding gun irrespective of welding gun movement or position. The constant force spring means exerts a force on the mounting means away from the wire feed direction, so that when the robot arm is inclined downwardly and the weight of the wire storage spool and wire straightener and drive means acts to move the mounting plate along the direction of wire fed and toward the welding gun, the counterweights move in the opposite direction from the mounting member direction of movement to counteract same and balance the force on the robot arm.

BRIEF DESCRIPTION OF THE DRAWINGS

FIG. 2 is an enlarged side elevational view of the wire storage and feed portions of the welding system illustrating the counterweighting and constant force means; and FIG. 3 is a partial plan view of the enlarged showing of FIG. 2.

DESCRIPTION OF THE PREFERRED EMBODIMENT

Figure 1:
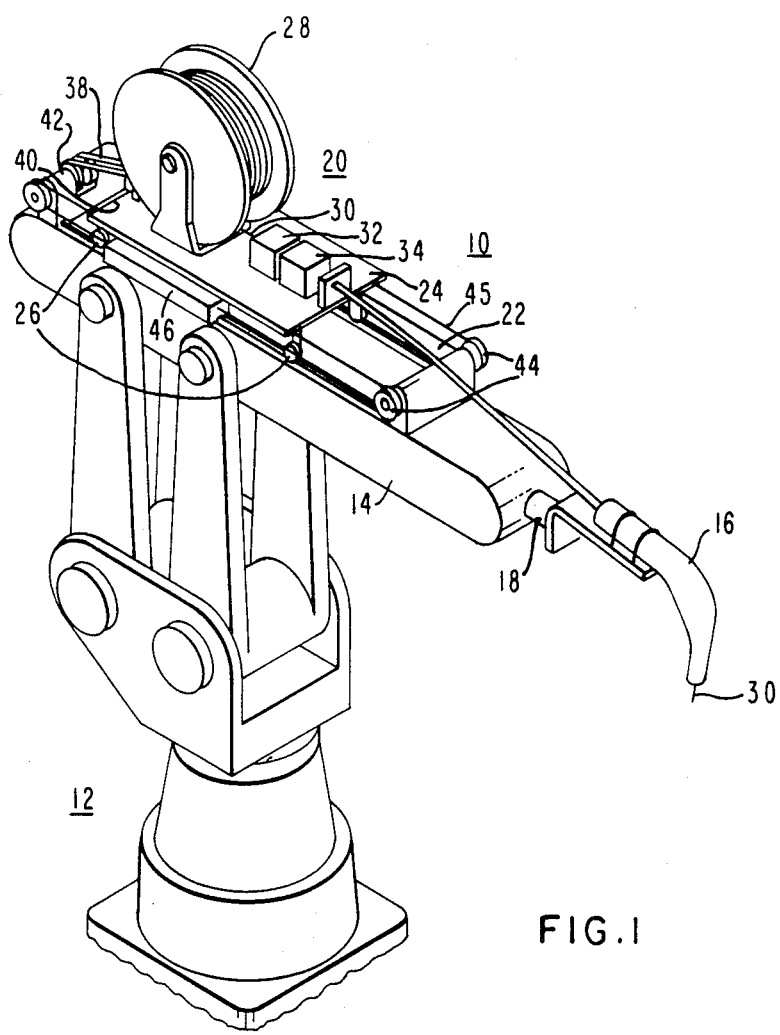
FIG. 1 is a side elevational view of the welding system of the present invention mounted on a robot.

The present invention can be best understood by reference to the embodiment seen in the drawings. In FIG. 1, the robot welding system 10 utilizes an Automatix AI32 robot 12 with multi-axis freedom of movement. The arm portion 14 of the robot 12 has metal inert gas welding gun 16 disposed at the extending end 18 of arm portion 14.

The wire storage and feed system 20 is mounted on the top of robot arm 14. The system 20 includes a base plate 22 mounted on and extending along the robot arm 14. An insulating layer is provided between the base plate 22 and the robot arm 14 to electrically isolate the robot arm from the welding potential which is applied to the welding electrode wire.

A movable mounting plate 24 is supported above the base plate by guide rails and is slidably movable along the base plate 22. A plurality of rollers 26 further support the mounting plate 24 and facilitate reciprocal movement of the mounting plate along the base plate as the robot arm is pivotally raised and lowered. A wire storage spool or reel 28 is supported upon the mounting plate 24. The electrode wire 30 for the welding gun 16 is stored on this spool or reel 28 and is fed to the gun via wire straightener means 32 and wire feed means 34 which are also disposed upon the mounting plate 24. A wire conduit 36 extends between the wire feed means 34 and welding gun 16, with the electrode wire fed within this flexible conduit 36. The conduit flexes as the welding gun is maneuvered by the robot.

A constant force spring means 38 extends between the one end 40 of the mounting plate 24 and the end 42 of the base plate. A plurality of pulleys 44 are disposed at opposed corners of the base plate 22, with four connector wires 45 extending from corner portions of the movable mounting plate and wound over the respective pulley 44 and attached to opposed ends of respective first and second counterweight members 46, 48. The counterweight members are slidably mounted relative to the base plate as by guide rails disposed along the length of the base plate.

Electrode wire 30 is fed from storage reel 28 through conventional wire straightener means 32 and feed drive means 34 through the flexible conduit 36 to the conventional metal inert gas welding gun 16. Such welding guns are well known in the art with inert shielding gas being introduced through the gun and directed onto the workpiece via the gun nozzle. The welding electrode wire is fed through the gun where it is electrically contacted by the welding power supply contact to apply the welding potential to the wire 30.

The electrode wire 30 is a small diameter aluminum welding material, such as 30 to 60 mil diameter 4043 or 5356 aluminum. The welding of the aluminum workpiece, which is typically an electronic package, may be carried out in a droplet or spray mode with the welding power and arc power controlled to determine the desired mode.

As the robot arm is raised and lowered to bring the welding gun accurately into registration with the workpiece, the weight of the wire storage and feed system must be compensated for to ensure accurate gun registration with the workpiece. Thus, as the robot arm is directed downward beyond the horizontal, mounting plate 24 slides forward along the base plate in the direction of wire feed. The constant force spring means 38 permits the movement of the mounting plate, and the counterweights move in the opposite direction from the mounting plate direction of movement. The counterweights thus offset the effect of the changed position of the relatively heavy wire storage reel. A constant tension is maintained on the welding gun irrespective of the relative position of the robot arm. The counterweighting of the movable weight of the wire storage and feed system minimizes influence of the weight of this system upon gun position.

Further details regarding metal inert gas welding systems, such as the welding gun structures, and coupling of the inert gas supply and welding electrical supply to the welding gun can be had from the aforementioned Welding Handbook article. Typical operating parameters for such welding systems are also described therein.

The invention has been described with respect to a specific robot, but is of course useable with any robot system which employs an elongated maneuverable operating arm which is adapted to mount a welding gun on the extending end of the robot arm. The robot and welding system are controlled by appropriate control means, and the control means ensures accurate positioning of the welding gun with the workpiece which is mounted on an X-Y adjustable work table. The welding gun is moved over the workpiece in a prescribed pattern to carry out welding on the workpiece. The workpiece is typically electrically grounded relative to the welding electrical supply.

I claim:

1. A wire storage and feed system for a metal inert gas welding system in which a welding gun is disposed at the extending end of a maneuverable robot arm, which wire storage and feed system comprises:
    (a) wire storage and feed drive means disposed on a mounting plate which is movably mounted on the robot arm and movable in the direction of robot arm extension;
    (b) wire conduit means connecting the welding gun and the wire storage and feed drive means;
    (c) constant force spring means connecting the wire storage and fed drive means mounting plate to the robot arm, and counterweight means connected to the wire storage and feed drive means mounting plate; and
    (d) pulley means spaced apart along the robot arm with connector means extending from opposed ends of the counterweight means to the wire storage and feed drive means mounting plate over respective spaced apart pulley means, with the counterweight and the constant force spring means maintaining a constant tension on the welding gun irrespective of movement or positioning of the robot arm and welding gun.

2. The wire storage and feed system set forth in claim 1, wherein the wire storage means comprises welding electrode wire wound on a reel, and wherein wire straightening means are disposed between the wire storage reel and wire feed drive means.

3. The wire storage and feed system set forth in claim 1, wherein a base plate is rigidly fastened to but electrically insulated from the robot arm and wherein a pair of spaced apart guide rails extend along the base plate and counterweight means are slidably mounted upon said guide rails.

4. The wire storage and feed system set forth in claim 3, wherein the pulley means are mounted at opposed corners of the base plate.

5. The wire storage and feed system set forth in claim 3, wherein the movable mounting plate is mounted along a guide rail supported from the base plate, and wherein a plurality of roller means extend from the underside of the movable mounting plate supporting the movable mounting plate upon the base plate.

6. A wire storage and feed system for a metal inert gas welding system in which a welding gun is disposed at the extending end of a maneuverable robot arm, which wire storage and feed system comprises:
    (a) wire storage and feed drive means disposed on a mounting plate which is movably mounted on the robot arm and movable in the direction of robot arm extension;
    (b) wire conduit means connecting the welding gun and the wire storage and feed drive means;
    (c) base plate rigidly fastened to but electrically insulated from the robot arm with a guide rail supported from the base plate with the movable mounting plate mounted along the guide rail, and wherein a plurality of roller means extend from the underside of the movable mounting plate further supporting the movable mounting plate upon the base plate;
    (d) constant force spring means connecting the wire storage and feed drive means mounting plate to the base plate on the robot arm, and counterweight means connected to the wire storage and feed drive means mounting plate; and
    (e) pulley means spaced apart along the base plate on the robot arm with connector means extending from opposed ends of the counterweight means to the wire storage and feed drive means mounting plate over respective spaced apart pulley means, with the counterweight and the constant force spring means maintaining a constant tension on the welding gun irrespective of movement or positioning of the robot art and welding gun.

* * * * *